(12) United States Patent
Bossmann et al.

(10) Patent No.: US 9,452,499 B2
(45) Date of Patent: Sep. 27, 2016

(54) METHOD FOR APPLYING HEAT RESISTANT PROTECTION COMPONENTS ONTO A SURFACE OF A HEAT EXPOSED COMPONENT

(71) Applicant: ALSTOM Technology Ltd, Baden (CH)

(72) Inventors: Hans-Peter Bossmann, Lauchringen (DE); Michael Stuer, Niederrohrdorf (CH); Daniel Renusch, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/488,433

(22) Filed: Sep. 17, 2014

(65) Prior Publication Data

US 2015/0083305 A1    Mar. 26, 2015

(30) Foreign Application Priority Data

Sep. 20, 2013   (EP) ..................... 13185413

(51) Int. Cl.
*B44C 3/12* (2006.01)
*C03B 29/00* (2006.01)
(Continued)

(52) U.S. Cl.
CPC ............... *B23P 15/02* (2013.01); *B23K 31/02* (2013.01); *B32B 37/14* (2013.01); *C04B 37/00* (2013.01); *C04B 37/005* (2013.01); *C04B 37/026* (2013.01); *E04F 13/0885* (2013.01); (Continued)

(58) Field of Classification Search
CPC ............... F01D 5/288; F01D 2230/10; F01D 2230/237; C04B 2237/086; C04B 2237/04; C04B 2237/78; C04B 37/00; C04B 2237/32; C04B 2237/363; C04B 2237/385; C04B 2237/592; C04B 2237/86; C04B 2237/597; B32B 3/16; B32B 9/005; B32B 9/047; B32B 5/028; B32B 37/12; B32B 7/12; B32B 3/14; B23P 15/04; E04F 13/0862; E04F 13/14; E04F 13/142; F23R 3/002; F23R 3/007
See application file for complete search history.

(56) References Cited

U.S. PATENT DOCUMENTS 4,563,128 A    1/1986 Rossmann
5,331,816 A    7/1994 Able et al.
(Continued)

FOREIGN PATENT DOCUMENTS

EP    0 895 028 A1    2/1999
WO    2004/042166 A1    5/2004

*Primary Examiner* — Alex Efta
(74) *Attorney, Agent, or Firm* — Buchanan Ingersoll & Rooney PC

(57) ABSTRACT

The invention refers to a method for applying heat resistant protection components onto the surface of a heat exposed component. The method including providing at least two separate heat protection components, and joining the at least two separate heat protection components onto their top surface and/or bottom surface and/or at least one side surface by flexible means for obtaining an integrally handable entity. The method further includes fixing the integrally handable entity by applying and brazing the surface of each heat protection component on the surface of the heat exposed component. The materials of the flexible means and for joining the flexible means on the separate heat protection components are selected such that the materials withstand brazing being performed under protective atmosphere, i.e. an atmosphere without or with reduced amount of oxygen, at process temperatures between 700° C. and 1200° C., and that the materials are burned out after brazing during a following oxidizing thermal step.

7 Claims, 1 Drawing Sheet

(51) Int. Cl.
*C04B 37/00* (2006.01)
*B32B 33/00* (2006.01)
*B23P 15/02* (2006.01)
*E04F 13/08* (2006.01)
*C04B 37/02* (2006.01)
*F01D 5/28* (2006.01)
*B23K 31/02* (2006.01)
*B32B 37/14* (2006.01)
*E04F 13/14* (2006.01)

(52) U.S. Cl.
CPC ......... F01D5/288 (2013.01); *B23K 2201/001* (2013.01); *C04B 2237/086* (2013.01); *C04B 2237/32* (2013.01); *C04B 2237/363* (2013.01); *C04B 2237/385* (2013.01); *C04B 2237/592* (2013.01); *C04B 2237/597* (2013.01); *C04B 2237/78* (2013.01); *C04B 2237/86* (2013.01); *C04B 2237/88* (2013.01); *E04F 13/0862* (2013.01); *E04F 13/0889* (2013.01); *E04F 13/14* (2013.01); *E04F 13/142* (2013.01); *F05D 2230/237* (2013.01); *F05D 2240/11* (2013.01); *F23R 2900/00018* (2013.01)

(56) References Cited

U.S. PATENT DOCUMENTS

| | | | |
|---|---|---|---|
| 7,198,860 B2 | 4/2007 | Vance | |
| 2004/0214051 A1* | 10/2004 | Morrison | B28B 19/0053 428/701 |
| 2006/0017186 A1* | 1/2006 | Redemske et al. | 264/39 |
| 2006/0284337 A1* | 12/2006 | Subramanian | C04B 35/573 264/258 |
| 2007/0054132 A1 | 3/2007 | LaBarge et al. | |
| 2008/0075907 A1* | 3/2008 | Silvestrin | B44C 1/28 428/49 |
| 2010/0260960 A1* | 10/2010 | Vance | F23R 3/007 428/44 |

* cited by examiner

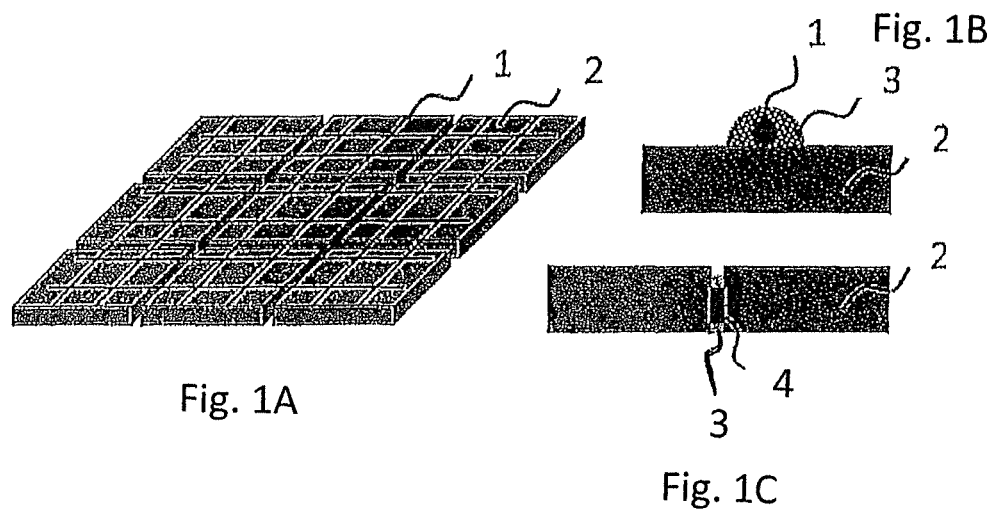
Fig. 1A
Fig. 1B
Fig. 1C
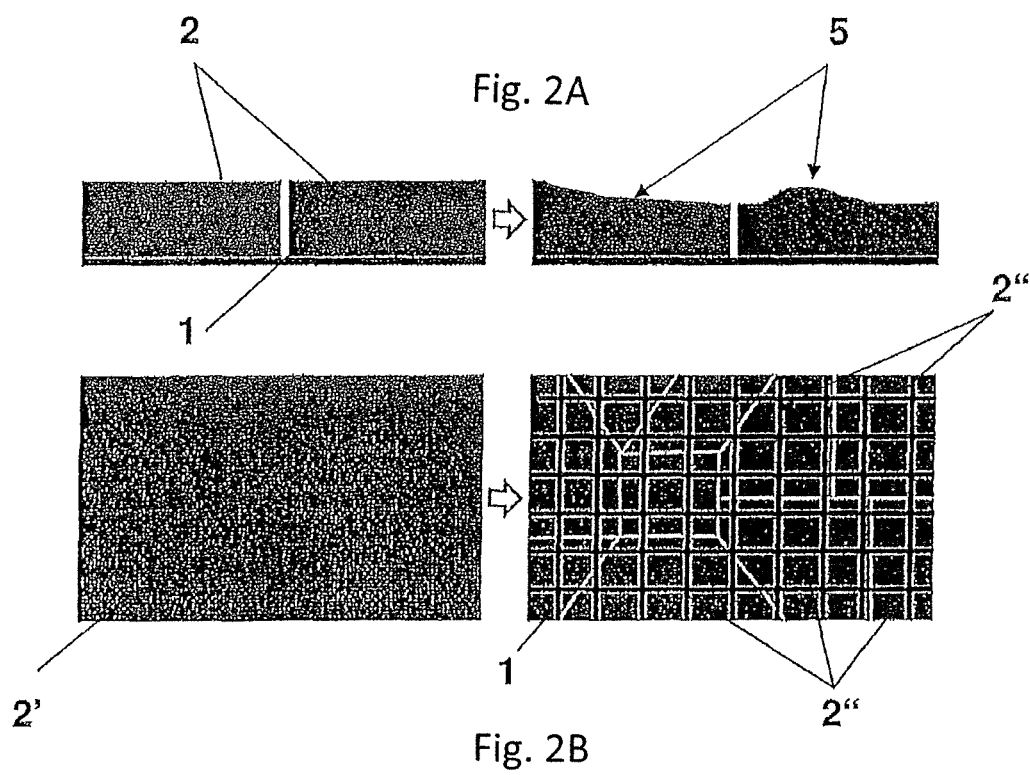
Fig. 2A
Fig. 2B

METHOD FOR APPLYING HEAT RESISTANT PROTECTION COMPONENTS ONTO A SURFACE OF A HEAT EXPOSED COMPONENT

CROSS-REFERENCE TO RELATED APPLICATIONS

This application claims priority to European application 13185413.5 filed Sep. 20, 2013, the contents of which are hereby incorporated in its entirety.

TECHNICAL FIELD

The invention relates to a method for applying a heat resistant protection component onto a surface of a heat exposed component, like a combustor liner of a combustor, or vanes, blades or heat shielding elements as components of a turbine of a gas or steam turbine arrangement.

Thermal stability of materials from which components are manufactured for the use especially in gas turbine arrangements may not be high enough to withstand process temperatures in the range above 1400° C. Therefore in modern and future gas and steam turbine arrangements great efforts must be made to protect the heat exposed components against high temperature stress. Firstly, the heat-exposed components can be cooled by means of cooling techniques, for example by providing cooling channels inside heat-exposed components through which cooling air is directed under pressure. Secondly, the components are covered with a heat protective layer at least in those areas which are exposed to a particularly high heat load.

BACKGROUND

Conventional heat protective layers are so called thermal barrier coatings (TBC) which are highly advanced material systems for formally insulating components from large and prolonged heat loads.

Current thermal barrier coatings (TBCs) may reach their application limits in high advanced gas turbines due to the limited capacities to control their micro-structure from the process parameters and the reduced choice of materials suitable for thermal plasma spraying. One way to overcome these limitations is to move away from the TBC coatings and replace them with so called ceramic tiles which can be fixed on the surface of the heat exposed component with different fastening technologies.

In the document U.S. Pat. No. 4,563,128 ceramic tiles are clamped in dovetail type recesses in the flank area of a turbine blade.

The document EP 0 895 028 B1 discloses a ceramic lining for combustions spaces comprising at least one wall panel, made of a heat resistant structural ceramic. Said wall panel provides an opening through which a fastening element, like a screw, being arranged for fastening said wall panel to the inner wall of the combustor.

Documents U.S. Pat. No. 7,198,860 B2 and US 2010/0260960 disclose ceramic tile insulation for gas turbine components with a multitude of ceramic tiles which are bonded to a heat exposed surface of a gas turbine component. A first layer of individual ceramic tiles are bonded to the surface of the gas turbine component which is of ceramic material. A second layer of individual tiles is bonded on top of the first layer. Multiple tiles may be attached to a flexible scrim, such as a woven ceramic cloth. These documents also describe that an entire sheet containing multiple tiles may be applied with adhesive to a gas turbine component.

A particular challenge is to cover at least those surface areas of a heat exposed component which suffer a special high temperature stress under working conditions with a multitude of single ceramic plate-like tiles which together shall form a uniform thermal protection layer surface. A particular challenge in this connection is to cover at least those surface areas of a heat exposed component which suffer a special high temperature stress during working conditions with a multitude of single ceramic plate like tiles which have to be handled and fixed onto the surfaces piece by piece. The curvatures and high thermal gradients imposed to those ceramic tiles require the use of smallest possible tiles to allow a good respect of the desired component shape and to limit risks of cracks occurring under high thermal gradients. Such ceramic tiles could be attached to the metal surface of the heat exposed components like turbine plates by brazing techniques. However the thermal expansion on the hot surface requires respecting a minimum tile distance to prevent them from mutually detaching themselves during expansion upon heating. It is a matter of fact that handling of each single ceramic tile to a defined position and bonding the tiles on the surface of the heat exposed component lead to a huge time and working expense which shall be reduced inventively.

SUMMARY

It is an object of the invention to provide a method for applying heat resistant protection components onto a surface of a heat exposed component which shall reduce time, work and cost expense and shall ensure at the same time an exact positioning and bonding of each of the multitude of tiles onto the surface of the to be protected heat exposed component.

The object is achieved by the sum total of the features of the independent claim 1. The invention can be modified advantageously by the features disclosed in the sub claims as well in the following description especially referring to preferred embodiments.

The inventive method for applying heat resistant protection components for example ceramic tiles, with a surface onto a surface of a heat exposed component comprises the following steps:
   providing at least two separate heat resistant protection components,
   joining the at least two separate heat protection components onto their top surface and/or bottom surface and/or at least one side surface by flexible means and fixing the flexible means with the heat protection components by an adhesive material for obtaining an integrally handable entity,
   fixing the integrally handable entity by applying and brazing the surface of each heat protection component on the surface of the heat exposed component, wherein
   the flexible means are made of a material that withstands brazing being performed under protective atmosphere, i.e. an atmosphere without or with reduced amount of oxygen, at process temperatures between 700° C. and 1200° C.,
   the adhesive material withstands brazing being performed under protective atmosphere, i.e. an atmosphere without or with reduced amount of oxygen, at process temperatures between 700° C. and 1200° C. and
   burning out said materials after brazing during a following oxidizing thermal step.

In a preferred embodiment water steam is added during the oxidizing thermal step for a faster burn out of carbon materials.

In the first step of the method at least two, preferably a multitude of separate heat protection components which in a preferred embodiment have a plate-like shape, for example ceramic tiles, are arranged on a mounting surface side by side. All ceramic tiles—the expression "ceramic tile" will be used in the following instead of heat protection components without limitation of shape and size of possible heat protection components—may not be necessarily of the same shape and size but provide a surface being adapted to the surface area to the heat exposed component. All ceramic tiles are connected by flexible means, i.e. every two adjacently arranged tiles will be joined by flexible means so that all ceramic tiles are in a flexible network comparable to a laying mat which can be handled in one piece without the individual tiles can change their positions relative to each other.

The integrally handable entity will be fixed in a next step by applying and brazing the surface of each ceramic tile on the surface of the heat exposed component. Brazing of all the ceramic tiles being connected all together can be carried out in one single step so that the whole operating expense can be reduced significantly.

In a first preferred embodiment for joining the at least two separate ceramic tiles a net mesh as flexible means is applied and fixed at the at least two ceramic tiles on a surface of the tiles being opposite to the surface, which is adapted to the surface area of the heat exposed component.

Preferably the net mesh is made of a carbon fiber net or made of an organic compound, carbonizing under vacuum braze conditions. The net mesh attached by a carbon graphite paste on the at least two individual ceramic tiles. Before joining the at least two separate tiles by the flexible means, each of the ceramic tiles has to be adapted in shape and orientation to obtain a common tessellated surface composition in which each pair of neighboring tiles encloses a defined gap, for example having a gap width in the range of 50 µm.

Preferably the tessellated surface combination consisting of a multitude of ceramic tiles being flexible combined by the carbon net mesh may cover contour preserving the contour of the heat exposed component after applying onto the to be heat protected surface.

For fixing the integrally handable entity consisting of a multitude of individual ceramic tiles joined by flexible means, brazing will carried out in a protective atmosphere so that the net mesh material and also the adhesive material will remain intact and prevent the heat protection components from moving individually between each other. After brazing an oxidative burning step burns away those materials leaving a perfect equidistant arrangement of a multitude of ceramic tiles covering the surface of the heat exposed component.

Alternatively or in addition of the use of the carbon fiber net mesh carbon or graphite spacer elements can be added in the space between two neighboring heat protection components as flexible means.

BRIEF DESCRIPTION OF THE DRAWINGS

The invention shall subsequently be explained in more detail based on exemplary embodiments in conjunction with the drawing. In the drawing FIG. 1A shows in a first embodiment a perspective view on a mosaic-like arrangement of nine separate heat protection components (ceramic tiles) arranged side by side in the same plane enclosing to each other a gap and being joined by a flexible means in form of a carbon fiber net mesh, FIG. 1B shows a cross section of the ceramic tile with a carbon fiber net mesh attached to each ceramic tile via an adhesive paste, FIG. 1C shows in a cross section of the ceramic tiles another embodiment where a spacer element joins two neighboring ceramic tiles at each of two opposite side edges of the ceramic tiles, FIG. 2A illustrates in a cross section through two ceramic tiles being joined by a flexible means one way for 3D shaping of heat protecting components for adaption to the surface contour of a heat exposed component, and FIG. 2B illustrates in a top view of a ceramic tile another way for shaping of heat protecting components for adaption to the surface contour of a heat exposed component by cutting an initially single ceramic tile into a plurality of ceramic tiles having different shapes and sizes and being joined by a carbon net mesh.

DETAILED DESCRIPTION

FIG. 1A shows a perspective view on a mosaic-like arrangement of nine separate heat protection components 2 which are ceramic tiles all of the same rectangular shape and size. The ceramic tiles 2 are arranged side by side in a same plane enclosing to each other a gap, for example having a gap width of 50 µm, and being joined by a flexible means in form of a carbon fiber net mesh 1. Of course another material withstanding the high temperatures required for brazing could also be used. The carbon fiber net mesh 1 joins all nine ceramic tiles 2 at a same side. The carbon fiber net mesh 1 is fixed at each single ceramic tile 2 with an adhesive graphite or carbon paste 3 which is shown in FIG. 1B.

Alternatively or in combination with the carbon fiber net mesh 1 a carbon or graphite spacer element 4 joins two neighboring ceramic tiles 2 at each of two opposite side edges of the ceramic tiles, as it is shown in FIG. 1C.

Basically shape and size of each of the heat protection components 2 can be individually adapted to a surface of a heat exposed component for thermally protection purpose.

For applying the multitude arrangement of ceramic tiles 2 being joined each other by the flexible carbon net mesh 1 shown in FIG. 1a onto a surface of a not shown heat exposed component, the surfaces of the ceramic tiles 2 being opposed to the carbon fiber net mesh 1 will contact the surface of the heat exposed component and will be fixed on the component by brazing.

To avoid any degradation of the carbon fiber net mesh 1 as well the graphite or carbon paste 3 during brazing the carbon and graphite materials have to withstand process temperatures up to 1200° C. For this reason brazing will carried out under vacuum braze conditions or in a protective atmosphere. After brazing the carbon fiber net mesh and the graphite or carbon paste 3 can be removed during a following oxidizing thermal cycle. For faster burn out of the carbon material water steam can be added to the oxidizing atmosphere during the oxidizing thermal cycle.

FIG. 2A shows a cross section through two ceramic tiles 2 being arranged side by side enclosing a micro gap in between and being joined by a flexible carbon fiber net mesh 1 or a comparable flexible means for example a temperature resistant tape of polymeric film. To adapt the surface of each ceramic tile 2 to the surface contour of a heat exposed component onto which the mosaic like tile arrangement has to be applied, the surfaces 5 of each ceramic tile 2 can be structured by specific manufacturing steps, like erosion or abrasive techniques. This is shown in FIG. 2A.

FIG. 2B shows an example for dividing in way of cutting a initially single ceramic tile 2' into a plurality of ceramic tiles 2" having different shapes and sizes and being enjoined by a carbon net mesh 1. The geometry of each single ceramic tile 2" is chosen such that a three dimensional curved contour of a heat exposed component can be covered continuously by the mosaic like arrangement of specific separated ceramic tiles shown in FIG. 2B. Each ceramic tile is separated by a gap at heat exposed surface having a gap measures at least 50 μm and maximum 600 μm, preferentially 100 μm.

Of course, the present application is not limited to the described embodiments.

The invention claimed is:

1. A method for applying heat resistant protection components with a surface onto a surface of a heat exposed component, the method comprising:
    providing at least two separate heat resistant protection components;
    joining surfaces of the at least two separate heat protection components together by a flexible material and fixing the flexible material with the heat protection components by an adhesive material for obtaining an integrally handable entity;
    fixing the integrally handable entity by applying and brazing a surface of each heat protection component on the surface of the heat exposed component under an atmosphere without or with a reduced amount of oxygen, at process temperatures between 700° C. and 1200° C.,
    wherein the flexible material withstands the brazing being performed under an atmosphere without or with a reduced amount of oxygen, at process temperatures between 700° C. and 1200° C., and
    wherein the adhesive material withstands the brazing being performed under an atmosphere without or with a reduced amount of oxygen, at process temperatures between 700° C. and 1200° C.; and
    burning out the flexible material and the adhesive material after the brazing during a following oxidizing thermal step.

2. The method according to claim 1, wherein water steam is added during the oxidizing thermal step.

3. The method according to claim 1, wherein in the joining of the at least two separate heat protection components, the flexible material is a net mesh that is applied and fixed at the at least two separate heat protection components at a side opposite to the surface that is to be in contact with the surface area of the heat exposed component.

4. The method according to claim 1, wherein in the joining of the at least two separate heat protection components, a spacer-element is added between the at least two separate heat protection components being arranged side by side.

5. The method according to claim 1, wherein the at least two separate heat protection components are plate-like and consist of ceramic material, the flexible material is made of carbon or of an organic compound carbonizing under vacuum braze conditions and the flexible material is fixed at the at least two separate heat protection components by a graphite or carbon paste.

6. The method according to claim 1, wherein the brazing is performed under the atmosphere without oxygen.

7. The method according to claim 1, wherein the brazing is performed under the atmosphere with the reduced amount of oxygen.

* * * * *